… …

United States Patent [19]
Pockrandt

[11] 3,963,641
[45] June 15, 1976

[54] PROCESS FOR INTERRUPTING NORMAL OPERATION OF A HYDROCARBON GASIFICATION REACTOR

[75] Inventor: Günter Pockrandt, Bad Homburg, Germany

[73] Assignee: Metallgesellschaft Aktiengesellschaft, Frankfurt am Main, Germany

[22] Filed: Oct. 29, 1974

[21] Appl. No.: 518,836

[30] Foreign Application Priority Data
Dec. 6, 1973   Germany............................ 2360756

[52] U.S. Cl................................. 252/373; 48/215
[51] Int. Cl.²........................................... C01B 2/14
[58] Field of Search...................... 252/373; 48/215

[56] References Cited
UNITED STATES PATENTS

| | | | |
|---|---|---|---|
| 2,655,442 | 10/1953 | Mayland | 252/373 X |
| 2,772,952 | 12/1956 | Jacobs | 252/373 |
| 2,809,104 | 10/1957 | Strasser et al. | 252/373 X |
| 2,904,417 | 9/1959 | Nuyl | 252/373 |
| 3,462,250 | 8/1969 | Bedetti | 48/215 X |
| 3,705,108 | 12/1972 | Marion et al. | 48/215 X |
| 3,743,606 | 7/1973 | Marion et al. | 48/215 X |

OTHER PUBLICATIONS
Perrys, Chemical Engineers Handbook, McGraw-Hill, New York 1963, 9–24 to 9–30.

*Primary Examiner*—Howard T. Mars
*Attorney, Agent, or Firm*—Burgess, Dinklage & Sprung

[57] ABSTRACT

A hydrocarbon gasification reaction under normal operation reacts hydrocarbons with oxygen and water vapor under elevated pressures and temperatures to produce a product gas containing hydrogen and carbon monoxide. The reactor is provided with a burner through which the hydrocarbons to be gasified are sprayed under pressure, preferably through a burner lance. For interrupting normal reactions and holding the reactor at a desired temperature, the hydrocarbons are fed at a lower rate than during normal operation together with water vapor under a higher pressure than the hydrocarbons. This mixture is fed through the reactor burner which is used for normal operation of the reactor thereby atomizing the hydrocarbons/water vapor mixture. During interrupted operation, air is supplied to the reactor, preferably into the burner chamber thereof.

7 Claims, 1 Drawing Figure

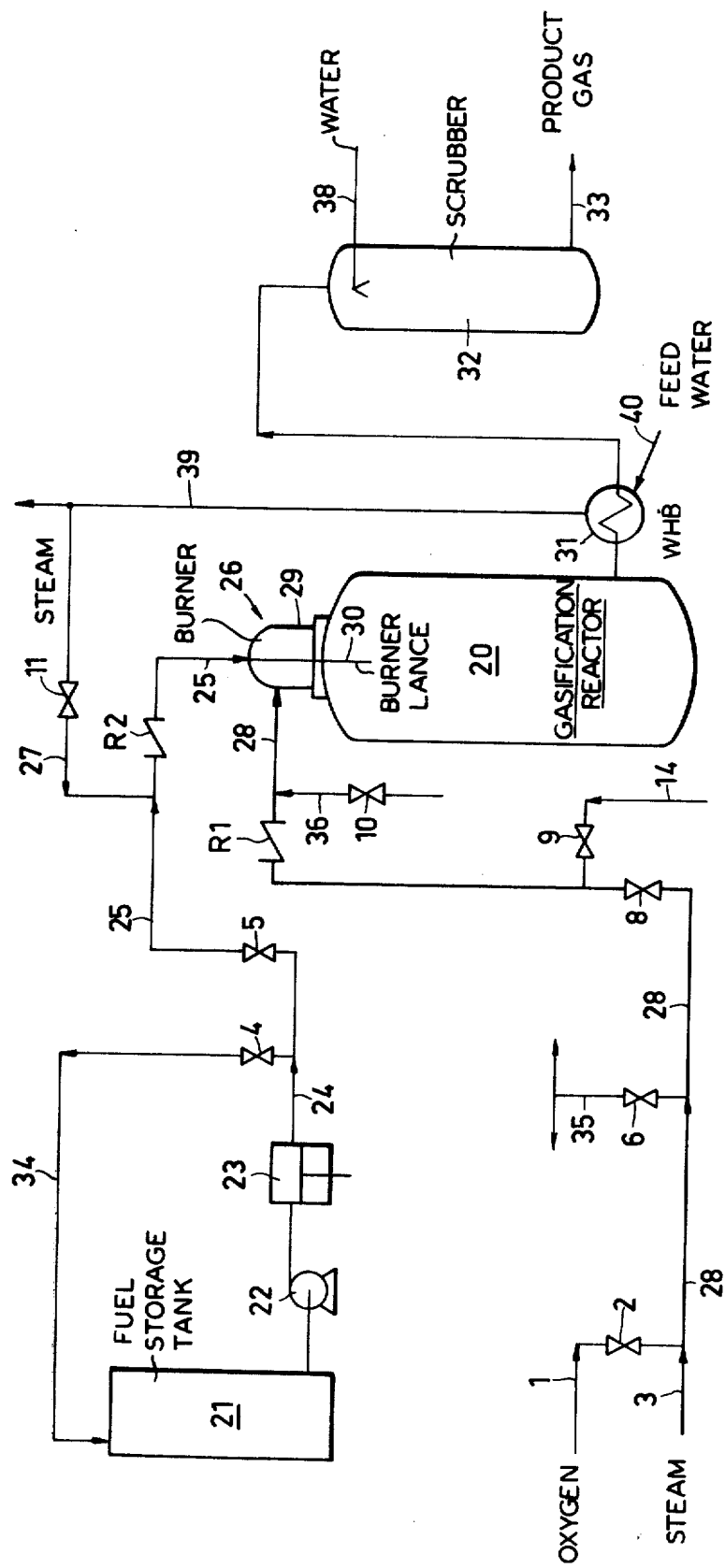

3,963,641

PROCESS FOR INTERRUPTING NORMAL OPERATION OF A HYDROCARBON GASIFICATION REACTOR

BACKGROUND

This invention relates to a process for operating a reactor for the gasification of hydrocarbons with oxygen and water vapor under a pressure of about 3–100 kilograms per square centimeter and at temperatures between about 1000° and 1500°C. to produce a product gas which contains mainly hydrogen and carbon monoxide. In the process, the hydrocarbons are sprayed under pressure through a burner into the reactor.

Gasifying processes of this kind are known, e.g., from Opened German Application Nos. 1,667,628 and 2,117,236. Because the plants for carrying out these processes operate under rather extreme temperature and pressure conditions, troubles often occur. In such case, the gasification must be interrupted so that the defect can be found and corrected. If the defect is not within the reactor and can be corrected within a relatively short time, it is desirable for economic operations that the temperature in the reactor does not drop too much from the operating temperature. In known gasifying plants, the burner used in normal operation is removed for this purpose or at least the lance of the burner is removed because the lance is designed to conduct hydrocarbons at a high rate during normal gasifying operations. A special holding burner is then installed, which is fed with air and a special fuel gas to hold the reactor at the required temperature, e.g., not below 900° C.

The known process of altering the burner involves additional costs so that the correction of a defect is rendered more expensive.

SUMMARY

The present invention eliminates this disadvantage. In the process defined first hereinbefore, this is accomplished in that the hydrocarbons at a low rate together with water vapor under higher pressure are conducted through the burner used also in normal operation and are atomized and air is supplied into the reactor when its normal operation has been interrupted and the reactor is to be held at a given temperature. During normal operation the hydrocarbons flow through the burner lance under such pressure that the hydrocarbons are automatically atomized by the lance acting like a nozzle. Hydrocarbons at a much lower rate are atomized by the water vapor which is supplied under pressure when the reactor is to be held at temperature. The air which is also supplied to the reactor ensures a complete or partial oxidation of the hydrocarbons in order to produce the heat required to hold the reactor at a high temperature.

DESCRIPTION

The water vapor is suitably added to the hydrocarbons upstream of the burner and under a pressure of about 10–60, in most cases about 20–40 kilograms, per square centimeter.

The process will be explained by way of example with reference to the drawing.

During a normal gasifying operation, hydrocarbons, such as heavy fuel oil (grade No. 5 or 6 fuel oil, bunker B or C fuel oil) are gasified with oxygen and water vapor. The usual temperatures in the reactor are in the range of 1000°–1500° C. and in most cases above 1300° C. The gasification is effected under superatmospheric pressure, often under pressures above 20 kilograms per square centimeter. The hydrocarbons come from the storage tank 21 and are fed to a burner 26 by a feed pump 22 and metering pump 23 in conduits 24 and 25. At this time the valve 4 is closed and valve 5 is open. A check valve R2 permits the hydrocarbons to flow freely to the burner 26. Also closed is a valve 11 in a conduit 27, through which water vapor can be supplied.

In normal operation, the two gasifying agents oxygen and water vapor flow jointly in the conduit 28 into the burner chamber 29 and in a reactor 20 mix with the hydrocarbon mist sprayed from a burner lance 30. Valves 6, 9 and 10 are closed. A check valve R1 permits of a free flow of the gasifying agent conduit through conduit 1 and the open valve 2. Water vapor flows in conduit 3.

In a normal gasifying operation it is possible to gasify, e.g., 14,400 kilograms heavy fuel oil (grade No. 5 or 6 fuel oil, bunker B or C fuel oil) with 6500 kilograms water vapor and 10,700 standard cubic meters oxygen per hour. In this case there is a differential pressure of about 100 kilograms per square centimeter at the burner lance. The product gas produced by the thermal gasification in the reactor 20 contains hydrogen and carbon monoxide as main constituents and is supplied to a waste heat boiler 31 first and then to a scrubber 32, where water from conduit 38 is sprayed into the gas to remove mainly carbon black therefrom. The scrubbed product gas is available in conduit 33 for further use. The water vapor produced in waste heat boiler 31 is conducted in conduit 39, from which conduit 27 branches off. Feed water is supplied to the waste heat boiler in conduit 40.

When a trouble which can be within relatively short time arises in the plant outside the reactor, the gasifying operation is shut down and the reactor is held at a high temperature so that the restarting of the plant is facilitated and accelerated. The plant is shut down as follows: The valve 2 is closed first to shut off the supply of oxygen. The valve 8 is then closed to shut off the supply of water vapor from conduit 3. The valve 9 is opened and nitrogen is forced through conduit 14 into conduit 28 to remove as fast as possible the remaining oxygen from line 28 and the reactor 20 and to prevent a backflow of oil mists. The valve 6 is open for a pressure relief of the gasifying agent conduit into the open. The reactor is then also pressure-relieved to atmospheric pressure in most cases. Besides, valve 4 is opened and valve 5 is closed so that the hydrocarbons are pumped through conduits 24 and 34 out of their tank 21 and are recirculated. The valve 11 may now be opened so that water vapor is forced through the conduits 27 and 25 into the burner and through the lance 30 thereof. This water vapor from conduit 27 is also referred to as blow-out steam and cleans the burner lance by a removal of residual oil and cools the lance at the same time. If the differential pressure at the burner lance is, e.g., 20 kilograms per square centimeter, about 300 kilograms steam enter the reactor per hour. The water vapor flowing in conduit 27 is produced as waste heat boiler or said water vapor may be supplied by other steam sources during a standstill.

The valve 10 is now opened so that compressed air flows through conduits 36 and 28 into the burner chamber 29. When the valve 4 has been closed and valve 5 has been opened, hydrocarbons from tank 21 are supplied at a low rate through conduits 24 and 25 into the reactor. This low rate of hydrocarbons preferably amounts to less than 10% of the rate supplied during normal gasifying operation, preferably to about 0.5-2% of that rate.

A reactor for a gasification of 14,400 kiloframs fuel oil can be held at temperature by about 100 kilograms fuel oil per hour. Whereas in normal operation the burner lance 30 acts as a nozzle for atomizing the hydrocarbons, they cannot be atomized at said low rate as a result of the geometry of the burner lance alone. The atomization is now effected by the water vapor (blow-out steam), which is supplied from conduit 27 and added under a pressure in the range of 10-60, preferably 20-40 kilograms, per square centimeter. The oil which is thus atomized into the reactor 20 burns entirely or partly with the aid of the compressed air from conduit 36 and thus holds the interior of the reactor 20 at a high temperature. If the reactor is operated at about 1300° C. it is desirably held at a temperature above 800° C., preferably 900°-1200° C.

The rate at which steam is supplied in conduit 27 is so adjusted that the pressure loss of the steam-oil mixture at the burner lance exceeds the supply pressure of the oil in the conduit between the feed pump 22 and metering pump 23. The feed pump consists preferably of a centrifugal or screw pump and the metering pump 23 or a reciprocating piston pump. To enable a metering by the correspondigly set pump 23, the pressure on its suction side must be lower than the pressure on the discharge side. It is sufficient if the pressure in the conduit 25 is higher by about 2-5 kilograms per square centimeter than the pressure in the suction conduit of pump 23.

If the plant is to be changed from an operation to hold the reactor at temperature to normal operation, the valves 5 and 11 are closed first, the valve 4 is opened and the hydrocarbons are recycled at the normal rate in conduits 24 and 34. When the valve 9 is opened and the valve 10 is closed, the reactor is first purged with nitrogen before the main valve 5 for the supply of oil to the burner 26 is closed. Valve 4 is then closed and the gasifying agents oxygen and water vapor are again supplied from conduits 1 and 3 through the opened valve 8 in conduit 28 into the reactor. The nitrogen purge can then be shut off at the valve 9.

The hydrocarbons used to hold the reactor at temperature need not be the same as those to be gasified. Other hydrocarbons, e.g., of lower quality, may be introduced into the conduit 25 between the closed valve 5 and the burner 26 and may be atomized into the reactor by means of the blow-out steam.

What is claimed is:

1. In a process for operating a reactor for the gasification of hydrocarbons with oxygen and water vapor under a pressure of about 3-100 kilograms per square centimenter and at temperatures between about 1000°C and 1500°C to produce a product gas which contains mainly hydrogen and carbon monoxide, wherein the hydrocarbons are fed under pressure to a burner and are sprayed from the lance of said burner in atomized form into the reactor where said atomized hydrocarbons react with a mixture of oxygen and water vapor supplied to the reactor, the improvement for interrupting normal operation and holding the reactor at temperatures above 800°C during interrupted operation which comprises shutting off the supply of said mixture of oxygen and water vapor and feeding to said burner lance used in normal operation a mixture of hydrocarbons and water vapor, said water vapor being fed under a pressure of about 10-60 kilograms per square centimeter, feeding said hydrocarbons used during said interrupted operation at a rate which is less than 10% of the rate used for normal operation by means of a feed pump and a succeeding metering pump and adjusting the pressure of said water vapor to be mixed with said hydrocarbons so that the pressure loss in the burner lance is higher than the feed pressure of the hydrocarbons between the feed pump and the metering pump, spraying an atomized mixture of hydrocarbons and water vapor into said reactor and burning at least part of said hydrocarbons together with compressed air fed into the reactor.

2. Process of claim 1 wherein the water vapor is fed together with the hydrocarbons under a pressure of about 20-60, kilograms per square centimeter.

3. Process of claim 1 wherein the water vapor used is blow-out steam which cleans and cools the lance of said burner, said steam being mixed with the hydrocarbons before entering the burner.

4. Process of claim 1 wherein the water vapor is produced in an indirect heat exchanger through which the product gas passes.

5. Process of claim 1 wherein the temperature of the reactor interior is about 900°-1200°C.

6. Process of claim 1 wherein the hydrocarbons are fed at a rate which is about 0.5-2% of the rate used for normal operation.

7. Process of claim 1 wherein a hydrocarbon other than that used for normal operation is used during interrupted operation.

* * * * *